United States Patent Office 3,045,547
Patented July 24, 1962

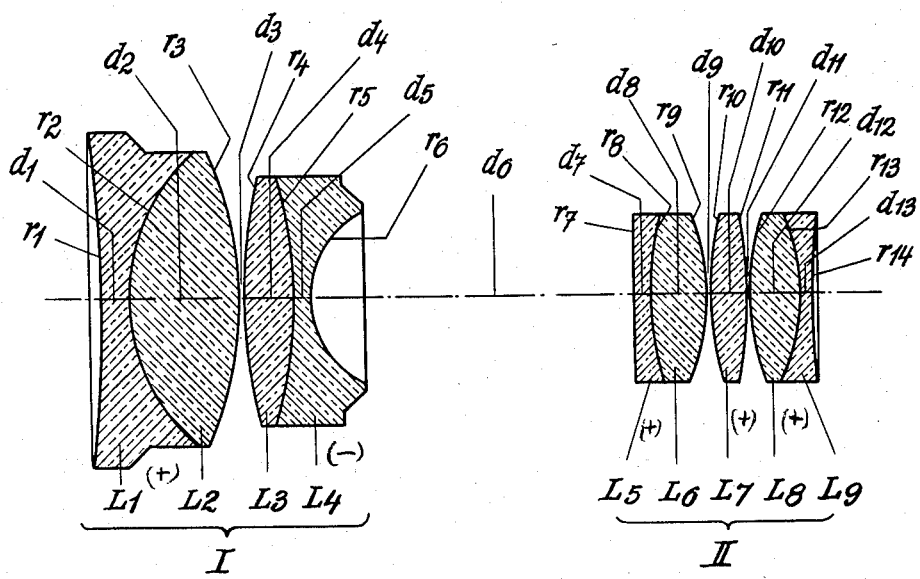

3,045,547
HIGH-SPEED PHOTOGRAPHIC OR CINEMATOGRAPHIC OBJECTIVE WITH WIDE IMAGE ANGLE
Wolfram Albrecht, Kreuznach, Rhineland, Germany, assignor to Jos. Schneider & Co., Optische Werke, Kreuznach, Rhineland, Germany, a corporation of Germany
Filed Sept. 30, 1958, Ser. No. 764,368
Claims priority, application Germany Oct. 11, 1957
2 Claims. (Cl. 88—57)

My present invention relates to a high-speed photographic or cinematographic objective having a wide image angle and a relatively long back-focal distance ranging between 150% and 250% of the overall focal length of the system.

Objectives of this charatcer are of particular value in photographic or cinematographic cameras having additional elements (shutters, deflecting mirrors or the like) located between the last vertex of the objective and the image plane. My invenion has for its principal object the provision of an improved objective of such a purpose, adapted to operate with a wide field angle while being of large back-focal length. Other, ancillary objects of the invention are the provision of means in such objectives for correcting chromatic astigmatism and coma as well as other aberrations.

In accordance with the present invention I have found that the above objects can be realized in an objective having a two-member object-side component and a three-member image-side component if, in contradistinction to conventional systems of this general character, the front member of the object-side component is made positively refracting while the associated rear member is negatively refracting, all three members of the image-side component being of positive refractivity. More particularly, in a preferred embodiment, each of these members is a doublet with the exception of the intermediate member of the image-side component which is advantageously given the form of a biconvex single lens.

I have further determined that, for optimum chromatic performance, the doublets of each component should face each other with their more strongly convex surfaces, their outer surfaces being either concave or substantially plane; also, each doublet should turn the concave side of its cemented surface toward the other doublet of the same component. Advantageously, for elimination of objectionable field curvature and zonal aberrations, the refractive indices of the lenses of each objective-side doublet for the $n_d$ line of the spectrum should differ by more than 0.22 whereas the corresponding difference in each doublet on the image side should be less than 0.22.

The invention will be described in greater detail with reference to the accompanying drawing the sole FIGURE of which shows, schematically and in axial section, a preferred embodiment.

The objective system shown in the drawing comprises a first component I on the object side and a second component II on the image side. The front member of component I consists of a negatively refracting first lens $L_1$, having radii $r_1$, $r_2$ and thickness $d_1$, which is cemented onto a positively refracting second lens $L_2$ (radii $r_2$, $r_3$ and thickness $d_2$). The rear member of the same component, spaced from its front member by a distance $d_3$, consists of a biconvex third lens $L_3$ (radii $r_4$, $r_5$ and thickness $d_4$) cemented onto a biconcave fourth lens $L_4$ (radii $r_5$, $r_6$ and thickness $d_5$). Members $L_1$, $L_2$ and $L_3$, $L_4$ are two menisci of respectively positive and negative refractivity, the cemented surfaces $r_2$, $r_5$ thereof turning their concave sides toward each other.

The first of the three positively refracting members of component II, which is separated from component I by the diaphragm space $d_6$, consists of a dispersive fifth lens $L_5$ (radii $r_7$, $r_8$ and thickness $d_7$) cemented onto a collective sixth lens $L_6$ (radii $r_8$, $r_9$ and thickness $d_8$). It is separated by an air spaced $d_9$ from a biconvex seventh lens $L_7$ or radii $r_{10}$, $r_{11}$ and thickness $d_{10}$, constituting the intermediate member of this component, which in turn is followed after an air space $d_{11}$ by a doublet consisting of a positive eighth lens $L_8$ (radii $r_{12}$, $r_{13}$ and thickness $d_{12}$) cemented onto a negative ninth lens $L_9$ (radii $r_{13}$, $r_{14}$ and thickness $d_{13}$).

The following table lists representative values of the radii, thicknesses and air spacings of the lenses $L_1$–$L_9$ shown in the drawing, given in terms of an overall focal length of numerical value 1 for an objective having an aperture ratio of 1:1.8, an image angle of 60° and a back-focal length of 1.9, together with the refractive indices $n_d$ and the Abbé numbers $\mu$ of these lenses.

| | Lens | Radii | Thicknesses and Air Spacings | $n_d$ | $\mu$ |
|---|---|---|---|---|---|
| I | $L_1$ | $r_1 = -12.340$ | $d_1 = 0.258$ | 1.7440 | 44.9 |
| | $L_2$ | $r_2 = +1.927$ | $d_2 = 1.098$ | 1.5145 | 54.6 |
| | | $r_3 = -3.304$ | $d_3 = 0.037$ | air space | |
| | $L_3$ | $r_4 = +5.970$ | $d_4 = 0.489$ | 1.7400 | 28.2 |
| | $L_4$ | $r_5 = -4.617$ | $d_5 = 0.208$ | 1.5111 | 60.5 |
| | | $r_6 = +0.920$ | $d_6 = 3.213$ | diaphragm space | |
| II | $L_5$ | $r_7 = +100.5$ | $d_7 = 0.146$ | 1.6727 | 32.2 |
| | $L_6$ | $r_8 = +3.388$ | $d_8 = 0.553$ | 1.5687 | 63.1 |
| | | $r_9 = -2.411$ | $d_9 = 0.005$ | air space | |
| | $L_7$ | $r_{10} = +4.044$ | $d_{10} = 0.393$ | 1.6779 | 55.5 |
| | | $r_{11} = -8.571$ | $d_{11} = 0.005$ | air space | |
| | $L_8$ | $r_{12} = +2.763$ | $d_{12} = 0.530$ | 1.6031 | 60.7 |
| | $L_9$ | $r_{13} = -1.998$ | $d_{13} = 0.115$ | 1.6989 | 30.1 |
| | | $r_{14} = +6.610$ | $d_{total} = 7.050$ | | |

It will be noted that the refractive indices $n_d$ differ by a value greater than 0.22 in the case of the doublets of component I (cemented surfaces $r_2$, $r_5$) and by a value less than 0.22 in the case of the doublets of component II (cemented surfaces $r_8$, $r_{13}$). The first doublet $L_5$, $L_6$ of component II is very nearly a plano-convex member.

The invention is not limited to the specific numerical values set forth above, nor to the exact lens configurations shown in the drawing, but may be embodied in various modifications without departing from the spirit and scope of the appended claims.

I claim:
1. An optical objective system comprising a first, posi- tively refracting meniscus-shaped doublet composed of a negative first lens and a positive second lens, a second, negatively refracting meniscus-shaped doublet air-spaced from said first doublet and composed of a positive third lens and a negative fourth lens, a third, positively refracting, substantially plano-convex doublet separated from said second doublet by a diaphragm space and composed of a negative fifth lens and a positive sixth lens, a biconvex seventh lens air-spaced from said third doublet, and a meniscus-shaped fourth doublet air-spaced from said seventh lens and composed of a positive eighth lens and a negative ninth lens, said first and second doublets having convex sides facing each other and being provided with cemented surfaces turning their concave sides toward each other, the refractive indices of said first and third lenses respectively exceeding those of said second and fourth lenses whereby the refractivity of said cemented surfaces is negative in said first doublet and positive in said second doublet, said third and fourth doublets having convex sides facing said seventh lens and being provided with cemented surfaces turning their concave sides toward said seventh lens, said first and second doublets having cemented surfaces across which their refractive indices differ by a value greater than 0.22, said third and fourth doublets having cemented surfaces across which their refractive indices differ by a value less than 0.22.

2. An objective system according to claim 1 wherein the radii $r_1$–$r_{14}$ and the thickness and air spacings $d_1$–$d_{13}$ of said first through ninth lenses $L_1$–$L_9$, based upon a numerical value of unity for the overall focal length of the system, the refractive indices $n_d$ of said lenses and the Abbé numbers $\mu$ thereof have numerical values substantially as given in the following table:

| Lens | Radii | Thicknesses and Air Spacings | $n_d$ | $\nu$ |
|---|---|---|---|---|
| $L_1$ | $r_1 = -12.340$ | $d_1 = 0.258$ | 1.7440 | 44.9 |
| $L_2$ | $r_2 = + 1.927$ | $d_2 = 1.098$ | 1.5145 | 54.6 |
|  | $r_3 = - 3.304$ | $d_3 = 0.037$ | air space | |
|  | $r_4 = + 5.970$ | $d_4 = 0.489$ | 1.7400 | 28.2 |
| $L_3$ | $r_5 = - 4.617$ | $d_5 = 0.208$ | 1.5111 | 60.5 |
| $L_4$ | $r_6 = + 0.920$ | $d_6 = 3.213$ | diaphragm space | |
|  | $r_7 = +100.5$ | $d_7 = 0.146$ | 1.6727 | 32.2 |
| $L_5$ | $r_8 = + 3.388$ | $d_8 = 0.553$ | 1.5687 | 63.1 |
| $L_6$ | $r_9 = - 2.411$ | $d_9 = 0.005$ | air space | |
|  | $r_{10} = + 4.044$ | $d_{10} = 0.393$ | 1.6779 | 55.5 |
| $L_7$ | $r_{11} = - 8.571$ | $d_{11} = 0.005$ | air space | |
|  | $r_{12} = + 2.763$ | $d_{12} = 0.530$ | 1.6031 | 60.7 |
| $L_8$ | $r_{13} = - 1.998$ | $d_{13} = 0.115$ | 1.6989 | 30.1 |
| $L_9$ | $r_{14} = + 6.610$ | | | |

References Cited in the file of this patent

UNITED STATES PATENTS

| | | |
|---|---|---|
| 2,548,569 | Tolle | Apr. 10, 1951 |
| 2,594,021 | Hopkins et al. | Apr. 22, 1952 |
| 2,862,418 | Lowenthal | Dec. 2, 1958 |

FOREIGN PATENTS

| | | |
|---|---|---|
| 891,469 | Germany | Sept. 28, 1953 |
| 1,154,396 | France | Oct. 28, 1957 |